(No Model.)

E. W. BROWN.
MACHINE FOR STRETCHING AND MOLDING THE UPPERS OF BOOTS AND SHOES.

No. 346,422. Patented July 27, 1886.

WITNESSES.  
INVENTOR.  
Edwin W. Brown.

UNITED STATES PATENT OFFICE.

EDWIN W. BROWN, OF BOSTON, MASSACHUSETTS, ASSIGNOR TO THE PRESTON MACHINE COMPANY, OF SAME PLACE.

MACHINE FOR STRETCHING AND MOLDING THE UPPERS OF BOOTS AND SHOES.

SPECIFICATION forming part of Letters Patent No. 346,422, dated July 27, 1886.

Application filed September 16, 1885. Serial No. 177,263. (No model.)

*To all whom it may concern:*

Be it known that I, EDWIN W. BROWN, of Boston, in the county of Suffolk and State of Massachusetts, have invented certain new and useful Improvements in Machines for Stretching and Molding the Uppers of Boots and Shoes, of which the following is a full, clear, and exact description.

This invention relates to improvements in machines for stretching or molding the uppers of boots and shoes, described and shown in Letters Patent of the United States, dated September 2, 1884, No. 304,502; and the invention consists in certain construction and arrangements of parts in connection with the machine described and shown in said Letters Patent for stretching or molding the upper of a boot or shoe, all substantially as hereinafter fully described, reference being had to the accompanying plate of drawings, in which is illustrated the present invention, in connection with enough of the parts of the machine described in said Letters Patent to show the connection between said machine and the present invention.

Figure 1:
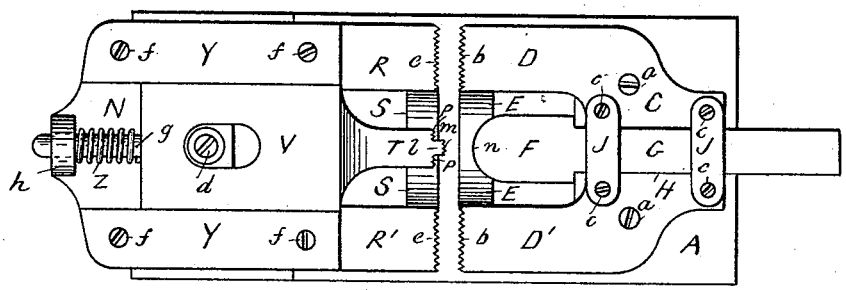
Figures 2, 4, 5:
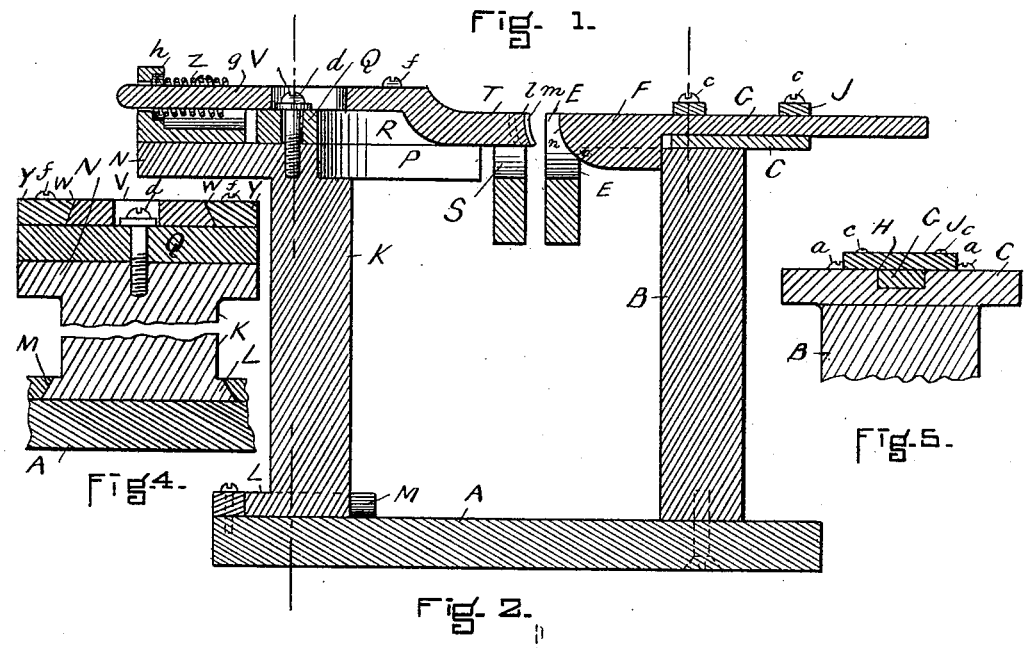
Figure 3:
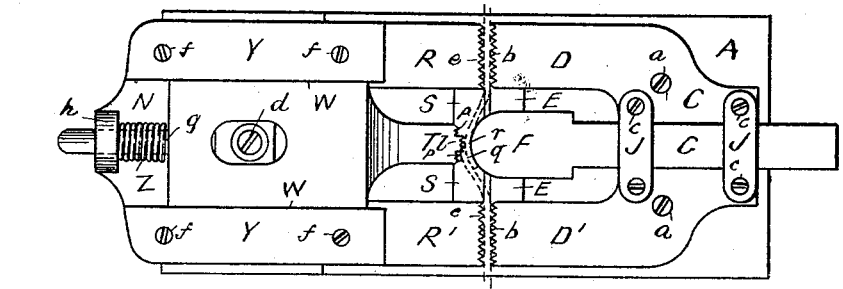

Figures 1 and 3 represent plan views of the machine, showing some of the parts respectively in two different positions. Fig. 2 is a longitudinal vertical section on line 2 2, Fig. 1. Fig. 4 is a detail vertical cross-section on line 4 4, Figs. 1 and 2; and Fig. 5 is a detail vertical cross-section on line 5 5, Fig. 2.

In the drawings, A represents a base having a fixed upright or standard, B. On the upper end of this standard is a horizontal plate, C, secured thereto by screws $a$, and having two arms, D D', from the ends of which depends a U-shaped jaw, E, the outer ends, $b$, of the arms forming a portion of the jaw.

F is a die or former, of the shape shown, and located between the arms D D'. This die or former is adapted by its extension G to slide forward and backward longitudinally in a guideway, H, and to be held from detachment by the cross-bars J, secured to the plate C by screws $c$.

K is another upright or standard, in line with and opposite to the standard B, and adapted by its flanged bottom L to move longitudinally forward and backward in a guideway, M, in the base A, such guideway being under beveled, as shown, to prevent upward movement and detachment of the standard from the base. On the top of this standard K is a horizontal plate, N, having arms P, to which plate is secured by a screw, $d$, a plate, Q, having arms R R', from which depends a U-shaped jaw, S, like, opposite to, and in line with the jaw E, the ends $e$ of the arms forming a portion of the jaw.

The parts thus described and shown are substantially the same as represented in the machine described in said Letters Patent, and are the parts more particularly necessary to show in connection with the present invention, the means for operating them not being shown in the present application.

In the use of the machine described and shown in said patent, when the side of an upper of a boot or shoe operated upon by the machine consists of two parts stitched together, if one part is of less strength than the other the machine will stretch such part more than the other part, consequently making the full stretch unequal and uneven, which is objectionable; and the object of the present invention is to prevent such unevenness of the stretch, and to stretch the upper each side of the seam alike, and thus give a uniform stretch to the whole portion operated upon by the machine.

T is a small jaw in the same horizontal plane with and between the arms R R' of the jaw S, and projecting toward and in the same central longitudinal line with the die or former F. This jaw T is on the end of a plate, V, which is adapted to slide longitudinally back and forth on the plate Q in bevel-grooves W, formed by a plate, Y, secured to the plate N by screws $f$. Projecting in a central longitudinal line back from the plate V is a rod, $g$, having a spiral spring, Z, encircling it and confined between the end of the plate and an abutment or shoulder, $h$, of the plate N. The outer end of the jaw T has a central projection or rib, $l$, as shown, its surface $m$ being concave to fit the outer end, $n$, of the die or former F, the surfaces $p$ each side of such projection being of a corresponding concave shape. The die or former serves, in connection with this jaw T, as intermediate jaws between the jaws E S, to grasp and hold the upper at a point between said jaws E S.

In stretching an upper of a boot or shoe in the machine with the present improvements applied thereto, the upper is inserted between the jaws E S. as described in said patent, with the seam or place where the two parts forming the side of the upper are stitched together between the jaw T and former F, so that the two thicknesses $q$ of material at the stitches will bear on the surface $p$ and the one thickness $r$ against the end of the central projection, as shown in Fig. 3, the upper being in dotted lines. The stand K, before the upper is placed between the jaws, is moved back sufficient to separate the jaw S from the other jaw, E, to allow of convenient insertion of the upper, as shown in Fig. 1, and when the upper is in position the standard K is moved forward toward the other standard, bringing its jaw S closely against the upper between the jaws, to there firmly and securely hold it beneath the jaws, for the purpose of operating thereon. The die or former F is then moved forward to stretch and mold the upper, as described in said patent, it also binding the upper at the seam between it and the jaw T, and as its forward movement is continued the upper is stretched at the unclamped portions between the jaws. The tension of the spring Z of the jaw T, as it is pressed backward by the forward movement of the former, as described, firmly holds the upper between it and the former, so it will not slip, and thus each side of the upper, each side of the jaw T and between it and the jaws E S, will be stretched equally, whether one part or side of the upper is stronger or weaker than the other part or side, as is obvious. The arrangement of the central projection, $l$, of the jaw T practically relieves the stitching at the seam of all strain, as the material is firmly held at and on the portion of the material each side of the stitches. When sufficiently stretched, moving back the former and then the standard K, separating its jaw from the jaw E, the upper can be removed and another one inserted and operated upon as before.

The swiveling of the jaw S accommodates it to inequalities of the thickness of the material. The jaws and the die or former can be arranged to be operated as described in said Letters Patent or in any suitable manner; also, the spring Z can be of any shape and be arranged to operate in any suitable manner, or a weight can be substituted therefor, so that the jaw T can be arranged to yield and move, for the purpose specified. The contiguous or operating surfaces of the several jaws are serrated or corrugated, to cause a firmer hold by the jaws on the material; also, the jaw T can have its bearing-surface large enough to fit any portion of the outer surface of the former F, as desired, although as shown is practical and satisfactory. The central projection, $l$, on the jaw T allows for the right or left side of the upper to be operated upon by the jaw; also, a side of an upper consisting of one piece can be operated upon by the machine as well as the side herein particularly described. The jaw T is arranged to move backward, to allow for the forward movement of the die F in molding or stretching the upper. The jaws E S can be made separate and attached to their supporting-plates C or Q.

The operating-surfaces of the die F and jaw T can be of other shapes than as shown—such as flat—although it is preferable to have them as shown.

Having thus described my invention, what I claim is—

1. In a machine for stretching the upper of a boot or shoe, two jaws adapted to grasp and hold the upper at or about the shank, means for opening and closing said jaws, and a movable die or former adapted to mold or stretch the unclamped portions of the upper between said jaws, in combination with an intermediate movable jaw provided with a spring or its equivalent, and adapted to grasp and hold the upper between it and said die or former, for the purpose specified.

2. In a machine for stretching the upper of a boot or shoe, two jaws adapted to grasp and hold the upper at or about the shank, means for opening and closing said jaws, and a movable die or former adapted to mold or stretch the unclamped portions of the upper between said jaws, in combination with an intermediate movable jaw provided with a spring or its equivalent, and adapted to slide in grooves and to grasp and hold the upper between it and said die or former, for the purpose specified.

3. In a machine for stretching the upper of a boot or shoe, two jaws adapted to grasp and hold the upper at or about the shank, means for opening and closing said jaws, and a movable die or former adapted to mold or stretch the unclamped portions of the upper between said jaws, in combination with an intermediate movable jaw having a central projection and provided with a spring, and adapted to slide in grooves and to grasp and hold the upper between it and said die or former, for the purpose specified.

In testimony whereof I have hereunto set my hand in the presence of two subscribing witnesses.

EDWIN W. BROWN.

Witnesses:
ZENAS S. ARNOLD,
H. P. FELLOWS.